(12) United States Patent
Temnykh

(10) Patent No.: US 9,275,781 B2
(45) Date of Patent: Mar. 1, 2016

(54) COMPACT UNDULATOR SYSTEM AND METHODS

(75) Inventor: Alexander Temnykh, Ithaca, NY (US)

(73) Assignee: Cornell University, Ithaca, NY (US)

( * ) Notice: Subject to any disclaimer, the term of this patent is extended or adjusted under 35 U.S.C. 154(b) by 0 days.

(21) Appl. No.: 14/237,656

(22) PCT Filed: Aug. 9, 2012

(86) PCT No.: PCT/US2012/050135
§ 371 (c)(1),
(2), (4) Date: Feb. 7, 2014

(87) PCT Pub. No.: WO2013/023053
PCT Pub. Date: Feb. 14, 2013

(65) Prior Publication Data
US 2014/0176270 A1     Jun. 26, 2014

Related U.S. Application Data

(60) Provisional application No. 61/521,606, filed on Aug. 9, 2011.

(51) Int. Cl.
| | |
|---|---|
| H01F 1/00 | (2006.01) |
| H01F 3/00 | (2006.01) |
| H01F 7/00 | (2006.01) |
| H01F 7/02 | (2006.01) |
| H01S 3/09 | (2006.01) |
| H05G 2/00 | (2006.01) |
| H05H 7/04 | (2006.01) |

(52) U.S. Cl.
CPC ............ *H01F 7/0284* (2013.01); *H01S 3/0903* (2013.01); *H05G 2/00* (2013.01); *H05H 7/04* (2013.01); *H05H 2007/041* (2013.01)

(58) Field of Classification Search
CPC ....... H01S 3/0903; H05G 2/00; H01F 7/0284; H05H 7/04; H05H 2007/041
USPC .................................. 335/284, 296, 302–306
See application file for complete search history.

(56) References Cited

U.S. PATENT DOCUMENTS

| | | | |
|---|---|---|---|
| 4,800,353 A * | 1/1989 | Csonka et al. | 335/210 |
| 4,977,384 A * | 12/1990 | Tatchyn et al. | 505/213 |
| 5,010,640 A | 4/1991 | Gottschalk | |
| 5,019,863 A * | 5/1991 | Quimby | 335/210 |
| 5,939,964 A * | 8/1999 | Domigan | 335/306 |
| 7,129,807 B2 * | 10/2006 | Rossmanith et al. | 335/216 |
| 7,196,601 B1 * | 3/2007 | Gottschalk | 335/217 |
| 7,872,555 B2 * | 1/2011 | Kitamura et al. | 335/306 |
| 7,896,224 B2 | 3/2011 | Temnykh | |
| 7,956,557 B1 * | 6/2011 | Waterman | 315/503 |
| 2013/0099881 A1 * | 4/2013 | Deyhim et al. | 335/216 |
| 2014/0301415 A1 * | 10/2014 | Harrison et al. | 372/2 |

OTHER PUBLICATIONS

Temnykh, "Evaluation of Magnetic and Mechanical Properties of Delta Undulator Model." Mar. 11, 2009.*

(Continued)

*Primary Examiner* — Bernard Rojas
(74) *Attorney, Agent, or Firm* — Valauskas Corder LLC

(57) ABSTRACT

An undulator with a compact construction is provided that reduces weight, complexity and cost. The compact undulator system and methods provides mechanical integrity without compromising magnetic field quality.

7 Claims, 6 Drawing Sheets

(56) References Cited

OTHER PUBLICATIONS

Biswas et al., "Design, construction and characterization of the compact ultrafast teraherlz free-electron laser undulator." Pramana J. Phys., vol. 71, No. 6, Dec. 2008.*

Lynch et al., "Mechanical Design of NSLS Mini-Gap Undulator (MGU)." Sep. 2002.*

Temnykh, Alexander B., Delta Undulator for Cornell Energy Recovery Linac, Physical Review Special Topics-Accelerators and Beams, Dec. 11, 2008, 120702-1-120702-10, vol. 11, The American Physical Society.

* cited by examiner

COMPACT UNDULATOR SYSTEM AND METHODS

PRIORITY

This application claims the benefit of U.S. Provisional Patent Application Ser. No. 61/521,606 filed Aug. 9, 2011.

GOVERNMENT RIGHTS

The present invention was made in part with government support under DMR-0936384 and DMR-0807731 awarded by National Science Foundation. The U.S. government has certain rights in the invention.

FIELD OF THE INVENTION

The present invention is related generally to insertion devices, and more specifically to an undulator system and methods employing a compact construction that provides mechanical integrity without compromising magnetic field quality thereby reducing weight, complexity, and cost.

BACKGROUND

Undulators are magnetic assembly insertion devices that are used at synchrotron radiation sources such as Free Electron Lasers (FEL) and Storage Rings. Undulators are used in the medical and industrial markets for x-ray or longer wavelength photon beam purposes.

Specifically, undulators include opposing magnet arrays producing a periodic spatial magnetic field distribution in a gap between them. A high-energy electron beam passing through this gap parallel to the arrays "wiggles" back and forth in its trajectory due to the periodic magnetic field. Undulators further may include temperature-stabilizing components selectively arranged to prevent a temperature-dependent change in the magnetic field of the undulator.

Undulators are periodic magnetic structures, and their magnetic field is essentially sinusoidal. Undulators with a magnetic field in one plane are called linearly polarized undulators. Undulators known as elliptically polarized undulators have an adjustable field direction. Some other undulators have a magnetic field direction that rotates. These are known as helical undulators.

The typical undulator consists of a massive C-shaped frame, two or four magnet arrays, and one or more driving mechanisms. Magnet arrays attached to the frame and driving mechanisms provide precise arrays motion, i.e. variation of the gap between them. Because forces between magnet arrays are quite significant (few tons) and varying, and the tolerances on magnet array position are quite small (few microns), the C-frame must be very stiff. These requirements require large and heavy structures for the magnet arrays holding. Furthermore, undulators are typically very expensive.

What is needed is a compact sized undulator that reduces weight, complexity, and cost and that provides mechanical integrity without compromising magnetic field control and quality. The present invention satisfies this need.

SUMMARY

The undulator of the present invention is much smaller and less expensive than conventional undulators while providing similar x-ray beam intensities and variable spectra. Providing a compact undulator according to the present invention is beneficial since the space around beam lines where undulators are installed is very limited. Furthermore, the undulator of the present invention weighs considerably less than conventional undulators.

According to the present invention, an undulator system and methods includes a rectangular box-shape frame. Miniature linear bearings or sliders are positioned within the rectangular box-shape frame and Pure Permanent Magnet (PPM) arrays (otherwise simply referred to as "magnet arrays") are fastened to the bearings. Specifically, each magnet array includes a base plate and permanent magnet blocks each positioned within a holder. The base plate is fastened to the bearings and the holders are secured to the base plate. In one embodiment, the holders are of a copper material. Each magnet block is soldered to a holder such that a gap is formed between opposing magnet arrays. The photon beam using an electron beam is generated in the gap. In addition, cooling elements are attached to the rectangular box-shape frame and to the magnet arrays in order to control temperature of the frame and arrays. At least one of the magnet arrays is moveable through the use of a driving mechanism that provides the motion of the magnet array along a beam axis. The magnetic field strength of the undulator—specifically within the constant gap between opposing magnet arrays—is controlled through the movement of the magnet array.

One advantage of the present invention over conventional undulators is that the undulator is much smaller and less expensive while providing the same functionality. Invented undulators can be easily transported, removed, and installed as well as can more easily be placed into existing geometries, which may facilitate facility upgrades.

An advantage of the present invention over the recently developed Delta undulator is that the present invention provides a large horizontal opening for the electron beam, which allows the use of the undulator in storage rings as well as at Free Electron Lasers (FEL) and Energy Recovery Linacs (ERL).

Another advantage of the present invention is the use of two magnet arrays versus four magnet arrays such as that used in the Delta undulator.

Another advantage of the present invention is that the compact undulator concept may be implemented in all types of undulators including, for example, linearly polarized undulators, elliptically polarized undulators, and helical undulators.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will be described in conjunction with the appended drawings provided to illustrate and not to the limit the invention, where like designations denote like elements, and in which.

DETAILED DESCRIPTION

Figure 1:
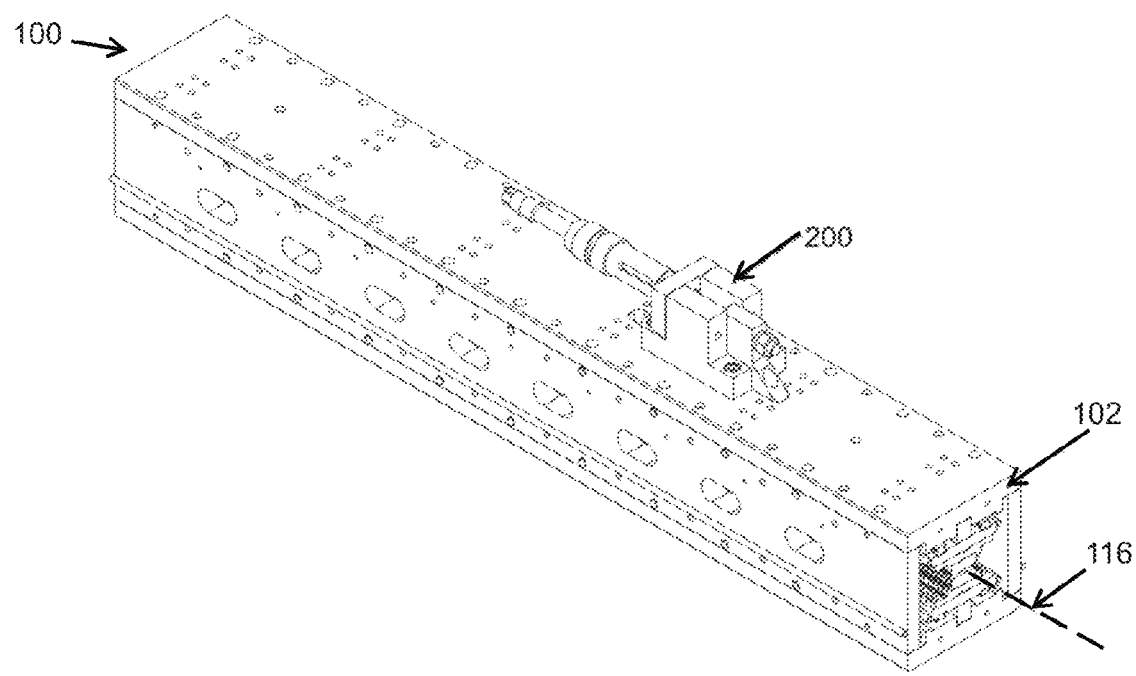
FIG. 1 is a perspective view of an undulator according to an embodiment of the present invention.
Figure 2:
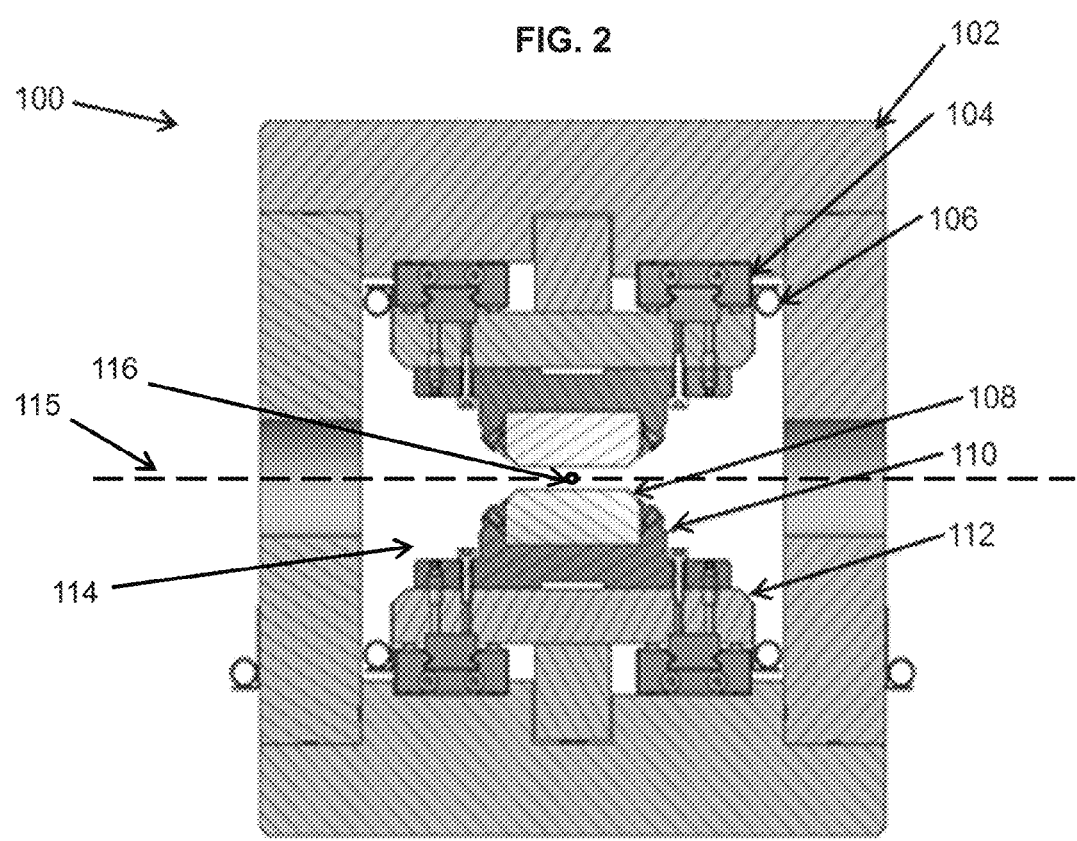
FIG. 2 is a cross-sectional view of an undulator according to an embodiment of the present invention.

FIG. 1 and FIG. 2 illustrate an undulator 100 according to an embodiment of the present invention. As shown in FIG. 1, the undulator 100 comprises a rectangular box-shape frame 102 and a driving mechanism 200. In an embodiment of the present invention, the frame 102 may be made of an aluminum material, specifically, four one meter long aluminum (6061-T6 alloy) sheets with 24 mm and 30 mm thickness. The total weight of the frame may be around 35 kg. A unique feature of the rectangular box-shape frame 102 is that the force loops are contained within a small, stiff structure. In other words, the rectangular box-shape frame 102 is much stiffer than conventionally used C-shaped frame structures. Where the large vertical forces typically result in a roll of the magnet girders in a conventional scheme, the rectangular box-shape frame 102 and lateral symmetry effectively eliminate that deformation.

Within the rectangular box-shape frame 102 is a pair of a base plates 112 as shown in the cross-sectional view of an undulator 100 according to FIG. 2. The base plates 112 position a plurality of holders 110, each holder with a permanent magnet block 108. Specifically, a holder 110 is secured to the base plate 112 such as by ⅛" Outer Diameter (OD) dowel pins and is fastened to the base plate 112 with fasteners, such as two #4-40 stainless steel screws. In an embodiment of the present invention, the holder 110 is made of a copper material.

The base plate 112, holders 110, and permanent magnet blocks 108 collectively form a magnet array 114. Each permanent magnet block 108 is soldered to a holder 110 so that a gap is formed between opposing permanent magnet arrays 114, for example a 5 mm constant vertical gap. The permanent magnet blocks 108 are soldered to the holders 110 such as by a soldering technique as disclosed in U.S. Pat. No. 7,896,224 to Temnykh issued Mar. 1, 2011, incorporated herein by reference.

In an embodiment of the present invention, the permanent magnet block 108 is preferably a neodymium magnet (also known as NdFeB, NIB, or Neo magnet), specifically 40 UH grade with Br=1.25 Tesla and Hcj=25.0 kOe.

Miniature linear bearings 104, otherwise referred to as sliders, are positioned within the rectangular box-shape frame 102. Each magnet array 114 is fastened to the miniature linear bearings 104. Specifically, the base plate 112 is fastened to the miniature linear bearings 104. The miniature linear bearings 104 provide magnet array 114 motion along a beam axis (see 116 of FIG. 3 and of FIG. 1) that is perpendicular and coplanar with axis 115 as shown in FIG. 2. This arrangement of the magnet arrays 114 on the linear sliders or bearings 104 inside of the rectangular box-shape frame 102 is an advantage over conventional designs of undulator insertion devices. It should be noted that the access to the central magnetic field region about beam axis 116 (see FIG. 3 and of FIG. 1) after the magnet arrays 114 are assembled is limited. Thus, magnet arrays 114 may be tuned individually before assembly.

Such an arrangement of the frame 102 and magnet arrays 114 and the use of the soldering technique for fastening the permanent magnet blocks 108 to the holders 110 results in significant reduction of transverse dimensions as well as a reduction of the weight of the undulator 100.

In an embodiment of the present invention, the linear bearings 104 chosen are a single row, profiled rail, four point contact, recirculating-ball style bearing composed primarily of 440C stainless steel. The bearings 104 have a static load capacity of 3.5 kN and a stiffness of 33 N/µm. The Polytetrafluoroethylene (PTFE) end caps of the bearings 104 may be replaced with custom fabricated bronze parts due to the deleterious effects of radiation on the PTFE components. All rolling elements are lubricated with ultra-high vacuum (UHV) compatible lubricant such as Krytox 16256.

There are two loading conditions considered to size the linear bearings 104. The first is the maximum vertical force of 6.3 kN that occurs with a zero phase between magnet arrays 114. By geometry, this can be assumed to be equally shared among the bearings. The more limiting case is due to the combined moment loading of the linear actuator and the equivalent vertical force. With a moment arm of 128 mm, the 6.3 kN driving force results in a reaction moment of 806 Nm that, when shared among the four nearest bearings with a spacing of 184 mm, requires a load capacity 2.2 kN per bearing.

With the opposing magnet arrays 114, the lower magnet array 114 is fixed to the frame 102 while the upper array 114 can be moved along beam axis (see 116 of FIG. 3 and of FIG. 1) that is perpendicular and coplanar with axis 115 by a half period (12.2 mm) by a driving mechanism 200 described more fully below. The magnet array 114 motion along a beam axis 116 (see FIG. 3 and FIG. 1) is used to control magnetic field strength. To minimize high-order mode power loss, a smooth path may be provided for the beam image current passing through the magnet array 114. For example, magnet arrays 114 may be covered with nickel plated copper foil discussed more fully below.

Cooling elements 106 attached to the magnet arrays 114 and the frame 102 may be used to control the magnet array 114 and frame 102 temperatures. Two monolithic, flexible water cooling elements 106 fabricated from bent 0.25" 316 SS tubing are connected to each magnet array 114 and to the rectangular box-shape frame 102. In an embodiment of the present invention, water may be used as a coolant such that the estimated cooling capacity is approximately 800 W/° K. In another embodiment, cold nitrogen gas may be used as a coolant such that the temperature of the magnet arrays 114 may be decreased to approximately 0° C. or lower. Cooling elements 106 decrease potential demagnetization of permanent magnet blocks 108 by radiation caused by a high energy electrons scattered from an electron beam.

Figure 3:
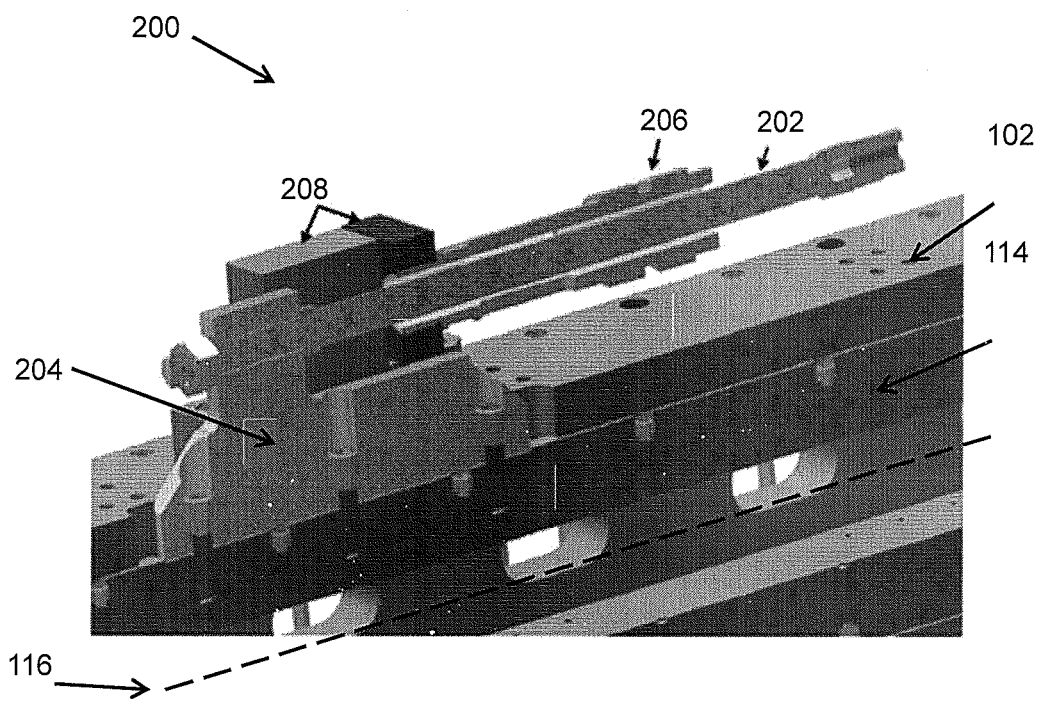
FIG. 3 is a perspective cross-sectional view of a driving mechanism according to an embodiment of the present invention.

FIG. 3 illustrates a driving mechanism 200 according to an embodiment of the present invention. The driving mechanism 200 includes a rod component 202 that is connected to the magnet array 114 through a plate component 204. A tube component 206, into which the rod component 202 is positioned, is attached to the frame 102 through connecting components 208. The upper magnet array 114 can be moved along beam axis 116 by pulling the rod component 202. The tube component 206 provides the path for the reaction forces.

It should be noted that the driving mechanism 200 shown in FIG. 3 does not include a vacuum vessel. It is contemplated that edge-welded stainless steel bellows may be used to link the driving mechanism to a stepper motor residing outside of the vacuum vessel in which both the rod component 202 and the tube component 206 pass through the bellows to keep the net force on the frame 102 and subsequently the magnet arrays 114 near zero.

In an embodiment of the present invention, the driving mechanism 200 was designed to provide 6.3 kN load (plus 30% margin) to move the magnet array 114. Furthermore, the driving mechanism 200 controls the phase of the movable magnet array with 7.2 kN thrust load capacity. It is comprised of a 5 mm lead, non-preloaded ball-screw supported by dual preloaded angular contact bearings. Actuation is achieved with open loop stepper motor positioning through a 7:1 helical gear set. The rod component 202 may be guided by plain bronze linear bearings. It has a specified repeatability of 25 μm and 250 μm of backlash. Because the loading due to the longitudinal component of the magnetic field is unidirectional, with standard backlash correction routines in the motor controller, the backlash may not be problematic.

The present undulator may have a magnetic field similar to conventional PPM planar undulators, may be approximately 10 times smaller in the transverse direction and weighs around 80 kg per meter of length. To control magnetic field strength, the design may use an adjustable phase (AP) scheme.

In an embodiment of the present invention, the basic properties of the undulator 100 are listed below in Table 1.

TABLE 1

| | |
|---|---|
| Magnetic structure | Pure permanent magnet (PPM) |
| Magnetic material | Nd—Fe—B, grade 40UH |
| Period | 24.4 mm |
| Gap | 5 mm - constant vertical gap |
| Peak field | 1.1 Tesla |
| Length | 1 m |
| x-ray polarization | Linear |
| Transfer dimensions W × H | 148 mm × 156 mm |
| Weight | ~62 kg per 1 m length |

The outside frame dimensions of the undulator may be 148 mm×156 mm. The undulator may be 1 meter long, and may have a 5 mm constant gap. The magnetic field strength may be controlled by an array longitudinal motion (adjustable phase scheme). The magnetic structure may have a 24.4 mm period and maximum magnetic peak field 1.1 Tesla. According to the present invention, the undulator 100 can provide similar x-ray beam intensities and variable spectra as conventional undulators. Moreover, the undulator of the present invention is much less expensive than conventional undulators.

The undulator may be enclosed in a 273 mm (10.75") diameter cylindrical vacuum vessel while the driving mechanism 200 responsible for moving the magnet array 114 is placed outside the vessel. Following is a discussion of the undulator 100 according to the present invention in terms of its mechanical, magnetic and vacuum properties, and results of magnetic field measurements as well as properties of the radiated x-ray beam.

Prior to assembly both magnet arrays 114 are individually tuned to minimize optical phase errors and beam trajectory distortion, for example, tuning may be performed by a small, about 0.1 mm, displacement of individual magnet blocks in a vertical direction.

The quality of the undulator according to the present invention and the magnet operation were confirmed in three experiments discussed below.

In the first experiment, access to the magnetic field region though the vent hole in a side plate was used to measure the field profile in a 33 mm span for various phases/positions of the upper array. The array was moved by a stepper motor driver. Results are illustrated in FIG. 4 and FIG. 5.

Figure 4:
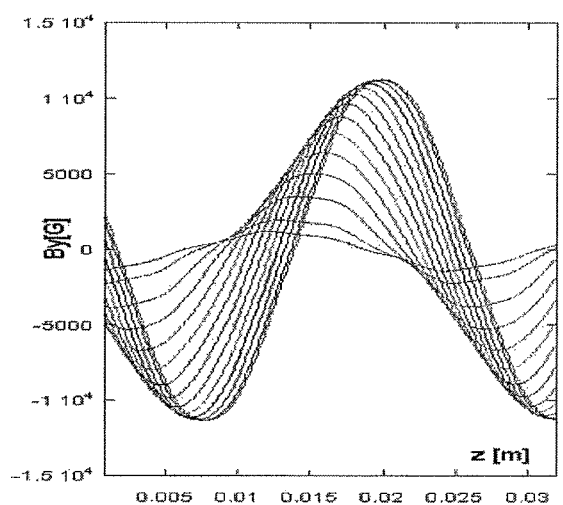
FIG. 4 illustrates a graph of measured field profiles as a function of the upper array position according to an embodiment of the present invention.

FIG. 4 illustrates a graph of measured field profiles as a function of the upper array position. The set of field profiles measured as the upper array was moved by a 1 mm or 14.880 step starting from zero. The first, 00, profile indicated a maximum 1.1 T peak field. The last profile taken at 169.70 exhibits a 0.12 T amplitude which is close to expected 0.099 T. The small difference can be explained by Hall sensor misalignment.

Figure 5:
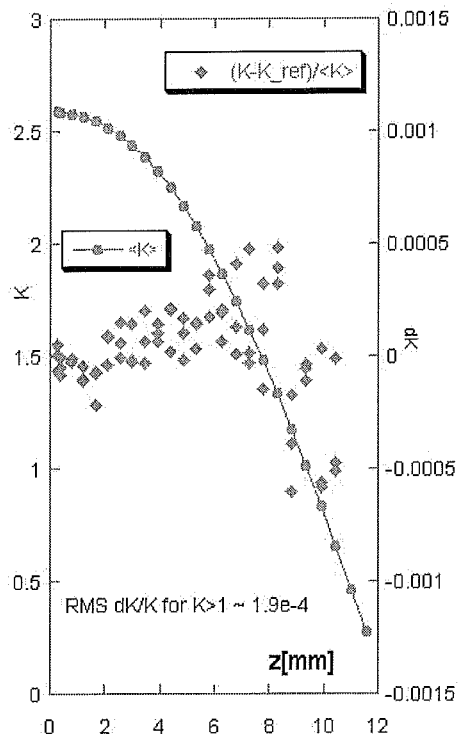
FIG. 5 illustrates a graph of measured K parameters as a function of the upper array position according to an embodiment of the present invention.

FIG. 5 illustrates a graph of measured K parameters as a function of the upper array position. The measured field profiles were used to calculate undulator K parameter. The profile was approximated by a sine function with three free parameters: amplitude $B_0$, period $\lambda$ and phase. $B_0$ and $\lambda$ p are used to calculate K as:

$$K=93.4 \times B_0[T] \times \lambda[m]$$

The solid circles of FIG. 5 depict the K parameter as a function of the array position. In this experiment, the array was moved by about a 0.5 mm/7.44° step. After each step, the field profile was measured and a K parameter was calculated. The lower plot indicates maximum K value of 2.588 at zero phase and close to zero at 180°. Note that the measured K maximum is approximately 2% higher than that predicted by the model. There are two possible sources of the discrepancy—the calibration of the Hall probe and the difference between the magnetic material magnetization used in model ($B_r$=1.26 T) and the real value.

To verify repeatability of the K parameter, the measurements were repeated a few times. Diamonds on the plot show the normalized K variation, dK/K, over four data sets relative to the first one. Stepper motor steps were used as the array position variable. The data indicate the dK/K repeatability at the level of 5 e-4, which is very satisfactory for the planned undulator application. The use of a precise encoder in array position control provides improved repeatability.

In the second experiment, to get full length access to the magnetic field region, one of the side plates was removed and C-clamps were attached to prevent frame distortion.

In this arrangement, the vertical magnetic field was measured along the beam axis for various upper array positions as well as the vertical field variation in the horizontal and vertical directions.

Figure 6:
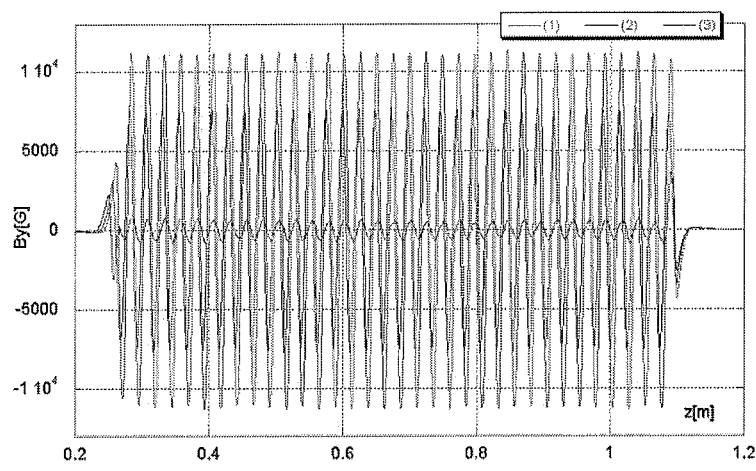
FIG. 6 illustrates a graph of vertical magnetic field versus position along the magnet array according to an embodiment of the present invention.

FIG. 6 depicts vertical magnetic field versus position along the magnet array for 0°, 93.7° and 177.6° phases. In the first case, the averaged peak field was 1.1177 T, which is in very good agreement with the model prediction. At 93.7°, the measurement indicated a 0.7603 T averaged peak field which is also consistent with the model. The RMS optical phase errors for both, the 0° and 93.7° fields, were around 3.4°.

Figure 7:
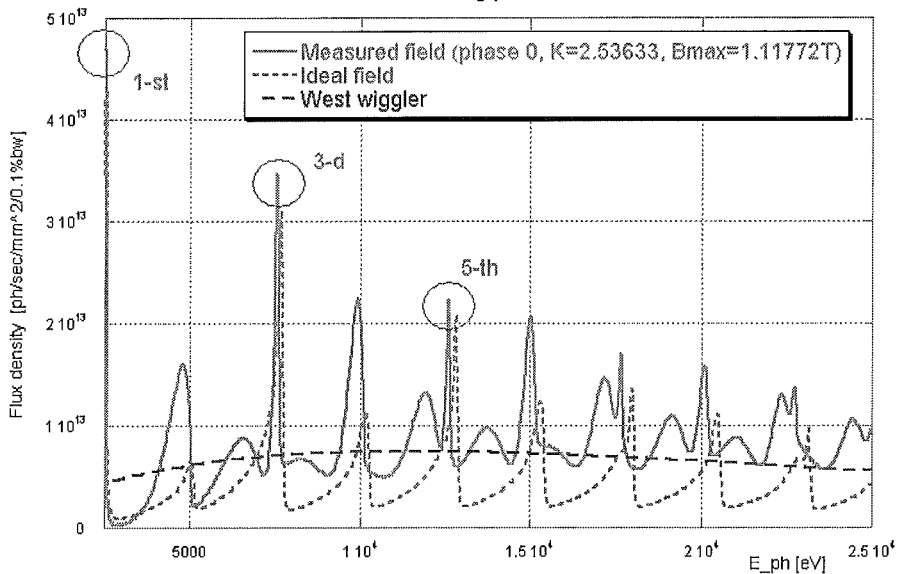
FIG. 7 illustrates a graph of x-ray flux density spectra calculated for the magnetic field measured with no displacement between magnet arrays in comparison with ideal field spectra according to an embodiment of the present invention.
Figure 8:
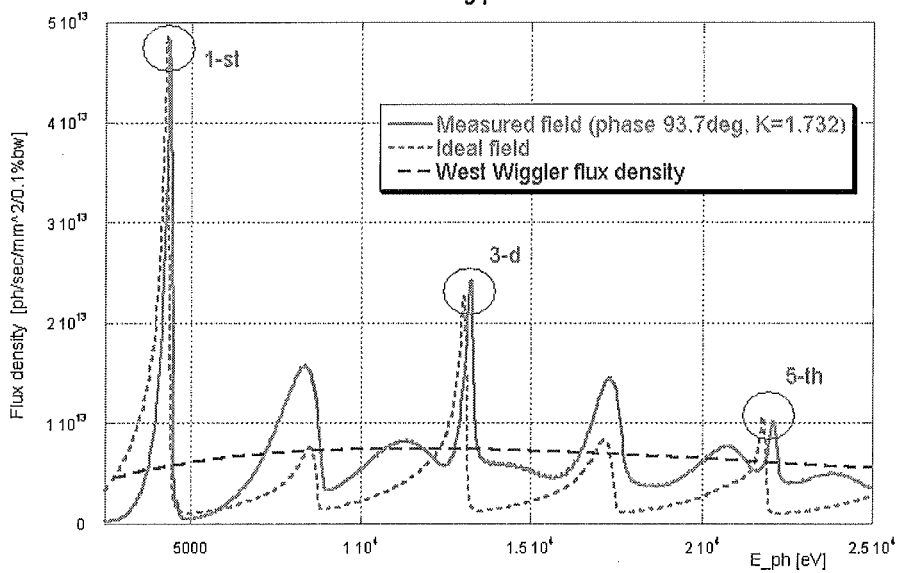
FIG. 8 illustrates a graph of x-ray flux density spectra calculated for the magnetic field measured with ~6 mm (~90° phase) displacement between magnet arrays in comparison with ideal field spectra according to an embodiment of the present invention.

To demonstrate that the field quality is adequate for the planned application, the x-ray flux density was calculated as a function of photon energy using the Cornell Electron Storage Ring electron beam parameters for the measured and ideal fields and compared. Results are illustrated in FIG. 7 and FIG. 8. The flux generated by G-line wiggler in the present conditions was added to illustrate the anticipated gain.

Small difference between flux densities at 1-st, 3-d and 5-th undulator harmonics calculated for measured and ideal fields confirms that the undulator field is satisfactory.

The field roll-off in the horizontal direction for all 68 poles was measured and it was found that the variation can be described as $$dB_y/B_y = -(1.98\pm0.49)\times10^{-4}\delta x^2 - (3.42\pm0.63)\times10^{-6}\delta x^4$$

where $\delta x$ is in mm. Mean values of the measured coefficients agree with predicted values insuring that the averaged dimensions of the permanent magnet blocks are consistent with the dimensions used in the model and that the tolerance on the beam orbit stability derived from the model field is relevant. The relatively large spread in coefficients is due to a real spread in the magnet blocks.

The vacuum properties of the in-vacuum undulator are critical. To evaluate vacuum properties of the undulator, both fully assembled magnet arrays were baked in a special constructed vacuum vessel.

Figure 9:
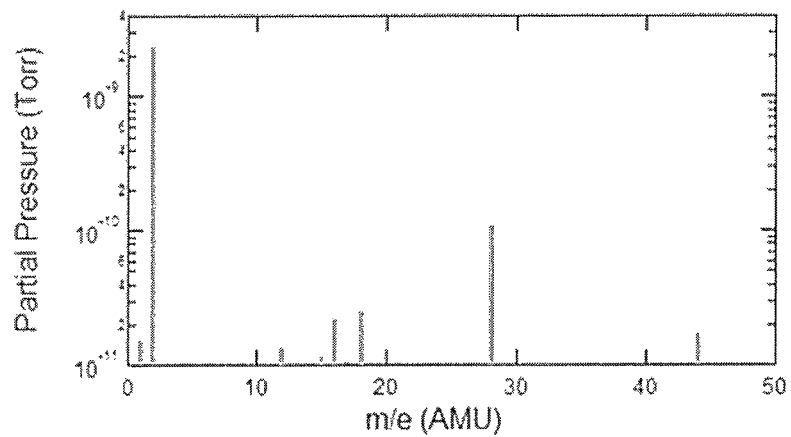
FIG. 9 illustrates a graph of residual gas analyzer spectra recorded at the end of second magnet array baking cycle.

To minimize potential damage (demagnetization) of the permanent magnet blocks by elevated temperature, the baking temperature was limited to 70° C. The baking time was about 100 hrs. The vacuum pumping during the vacuum tests was provided by a turbo-molecular pump and 75 l/sec ion pump. An ultimate pressure of about $5\times10^{-9}$ torr was reached after the bakeout for both magnet arrays. Residual gas analyzer (RGA) data also showed very clean mass spectra, dominated by hydrogen, as illustrated in FIG. 9.

To further evaluate vacuum outgassing of the baked magnet arrays, a rate-of-rise measurement was done after the bakeout. With all pumps tuned off, a 2.6 nTorr/sec of the rate of pressure rise is observed. With this measured rate-of-rise and 38.4 liters of vacuum vessel volume, the outgassing rate for one magnet array is estimated to be $\sim 1.0\times10^{-7}$ Torr*liter/sec.

In the third experiment undulator was tested with 5 GeV electron beam in Cornell Electron Storage Ring. Specifically, two aspects of undulator operation were evaluated—undulator radiation properties were characterized and undulator interaction with storage ring beams was evaluated.

For x-ray spectra measurement, an on-axis 0.2×0.2 mm slit 18.3 m downstream of the undulator and 2 m upstream of the double-bounce Si-111 monochromator was defined. The monochromator energy was scanned over a range of 8.6 to 25 keV, measuring the rocking curve of the second monochromator crystal at each energy. The x-ray flux was measured using a nitrogen-filled ion chamber. The measured ion chamber counts were normalized to the storage ring current. The flux was computed from theoretical ion chamber sensitivity based on the photo absorption cross section for nitrogen and a W-value of 34.6 eV/ion pair. This measured flux was then finally corrected for sources of attenuation along the beam axis, including beryllium windows, graphite filter, helium flight path, and air.

Figure 10:
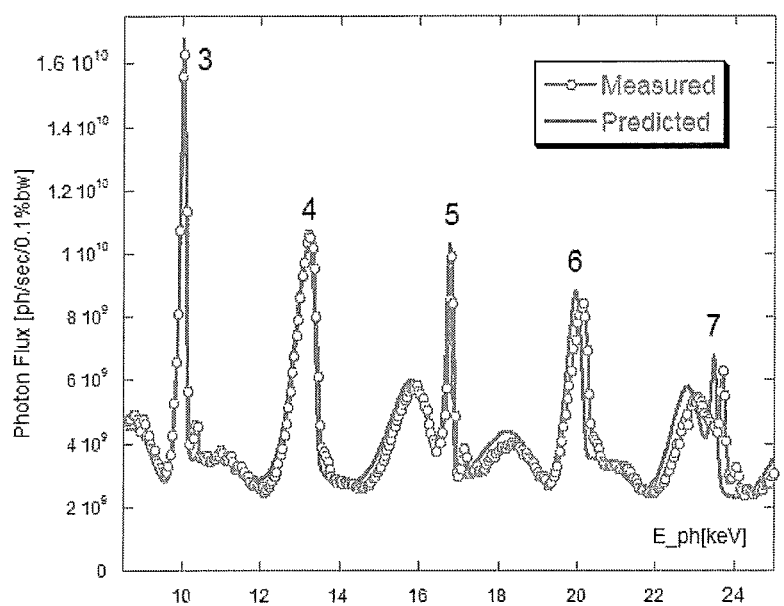
FIG. 10 illustrates a graph of measured x-ray spectra and predicted x-ray spectra for ideal undulator magnetic field according to an embodiment of the present invention.

The resulting measured and calculated x-ray spectra are presented in FIG. 10. At the time of measurement the undulator was tuned to 71.350 phase (K=2.130) to move third harmonic's energy slightly above 10 keV. An ideal undulator magnetic field was assumed in the calculations. A 1% coupling and beam current was also assumed. As shown in FIG. 10, the good agreement between measured and predicted undulator spectra up to 7-th harmonics indicated satisfactory undulator magnetic field quality.

Figure 11:
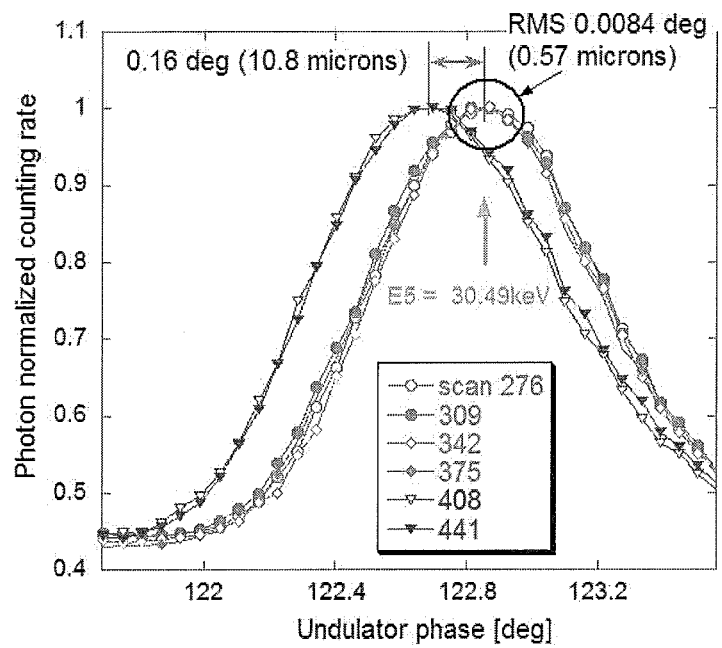
FIG. 11 illustrates a graph of photon normalized counting rate of photons with 30.49 keV energy as a function of undulator phase according to an embodiment of the present invention.

Undulator K parameter reproducibility is very critical to the operation. It directly depends on accuracy of the mechanical motion. To evaluate this, the monochromator was set to 30.491 keV photon energy and a number of undulator scans were made in the range from 121.69 to 123.56 degrees (K parameter was changing from 1.2763 to 1.2388). In this range, the 5-th harmonic of undulator radiation is crossing the selected energy and the dependence of the peak locations of photon counting rate on undulator phase can be used for the reproducibility evaluation. Data obtained from six scans are illustrated in FIG. 11.

The results reveal $1.4\times10^{-4}$ of K variation. Any presence of ~10 microns backlash when the undulator is moving may be avoided if the undulator is moved through the standard path.

Figure 12:
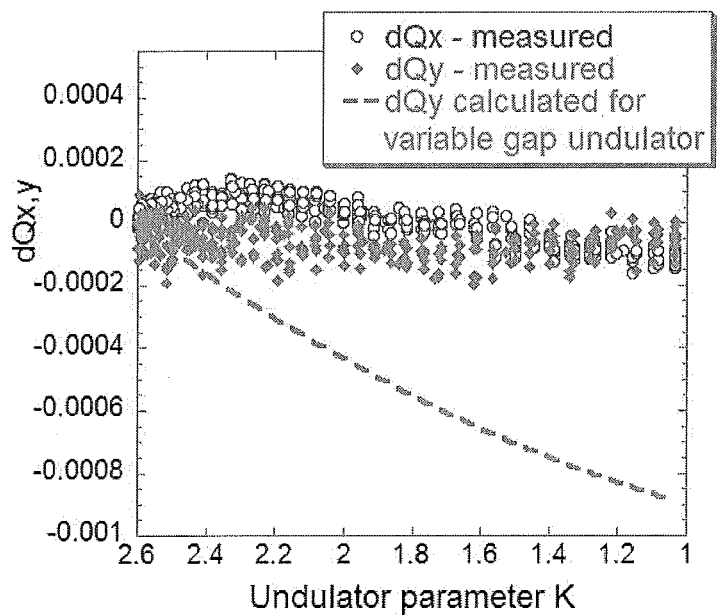
FIG. 12 illustrates a graph measured electron beam tune variations versus undulator parameter K according to an embodiment of the present invention.

One of the properties of an adjustable phase undulator is the independence of the beam focusing on K parameter. To check it, the electron beam tunes as a function of K were measured. The measurement results, together with vertical tune variation calculated for variable gap undulator, are illustrated in FIG. 12. The data confirms that in an AP structure the K parameter change does not affect storage ring beam focusing.

Prior to installation into the storage ring, magnetic field integrals were measured that showed the field integrals variation with K at 0.1 Gm level or less. The experimental data indicated peak-to-peak ~5 microns orbit variation with K change thereby estimating the upper limit on orbit variation as 2 microns and on the first magnetic field integral change less than 0.1 Gm.

The described embodiments are to be considered in all respects only as illustrative and not restrictive, and the scope of the invention is not limited to the foregoing description. Those of skill in the art will recognize changes, substitutions, adaptations and other modifications that will nonetheless come within the scope of the invention and range of the invention.

The invention claimed is:

1. An undulator system, comprising:
   a rectangular box-shape frame formed by aluminum plates, the rectangular box-shape frame including an inside surface and an outside surface;
   a plurality of miniature linear bearings, wherein each of the miniature linear bearings is positioned within the inside surface of the rectangular box-shape frame;
   opposing magnet arrays, wherein each magnet array is fastened to one or more miniature linear bearings, wherein one magnet array is moveable along an axis horizontal to the rectangular box-shape frame and the other magnet array is fixed to the rectangular box-shape frame, each magnet array further comprises:
   a base plate, wherein the base plate is fastened to the one or more miniature linear bearings;
   a plurality of copper holders, wherein each copper holder of the plurality is secured to the base plate; and
   a plurality of permanent magnet blocks, wherein each permanent magnet block is soldered to each copper holder forming a gap between the opposing magnet arrays.

2. The undulator system of claim 1 further comprising a plurality of cooling elements, wherein the plurality of cooling elements are attached to the rectangular box-shape frame and each base plate of the magnet array in order to control temperature of the magnet arrays.

3. The undulator system of claim 1 further comprising a driving mechanism positioned near the exterior surface of the rectangular box-shape frame, the driving mechanism used to move one magnet array of the opposing magnet arrays in order to control magnetic field strength of the undulator.

4. An undulator system, comprising:
- a rectangular box-shape frame, the rectangular box-shape frame including an inside surface and an outside surface;
- a plurality of miniature linear bearings, wherein each of the miniature linear bearings is positioned within the inside surface of the rectangular box-shape frame;
- opposing base plates, wherein each base plate is fastened to one or more miniature linear bearings of the plurality and the one or more miniature linear bearings provide movement of only one magnet array along an axis horizontal to the rectangular box-shape frame;
- a plurality of holders, wherein each holder is secured to each of the opposing base plates;
- a plurality of opposing magnet blocks, wherein each magnet block is soldered to each holder of the plurality of holders such that a gap is formed between the opposing magnet blocks;
- a plurality of cooling elements, wherein the plurality of cooling elements is attached to the rectangular box-shape frame and each base plate of the magnet array in order to control temperature within the rectangular box-shape frame; and
- a driving mechanism positioned near the exterior surface of the rectangular box-shape frame, the driving mechanism used to move only one base plate of the opposing base plates in order to control magnetic field strength of the opposing magnet blocks.

5. The undulator system according to claim 4, wherein each holder is made from a copper material.

6. The undulator system according to claim 4, wherein each magnet block is a neodymium magnet.

7. The undulator system according to claim 4, wherein driving mechanism further comprises:
- a rod component connected to one base plate of the opposing base plates;
- a tube component, wherein the rod component is positioned within the tube component; and
- one or more connecting components that attach the tube component to the rectangular box-shape frame, wherein manipulation of the rod component moves one base plate of the opposing base plates.

* * * * *